C. WINKLER.
LOCK BEARING FOR THE COMPOSITION ROLLERS OF PRINTING MACHINES.
APPLICATION FILED SEPT. 9, 1918.
1,329,217. Patented Jan. 27, 1920.
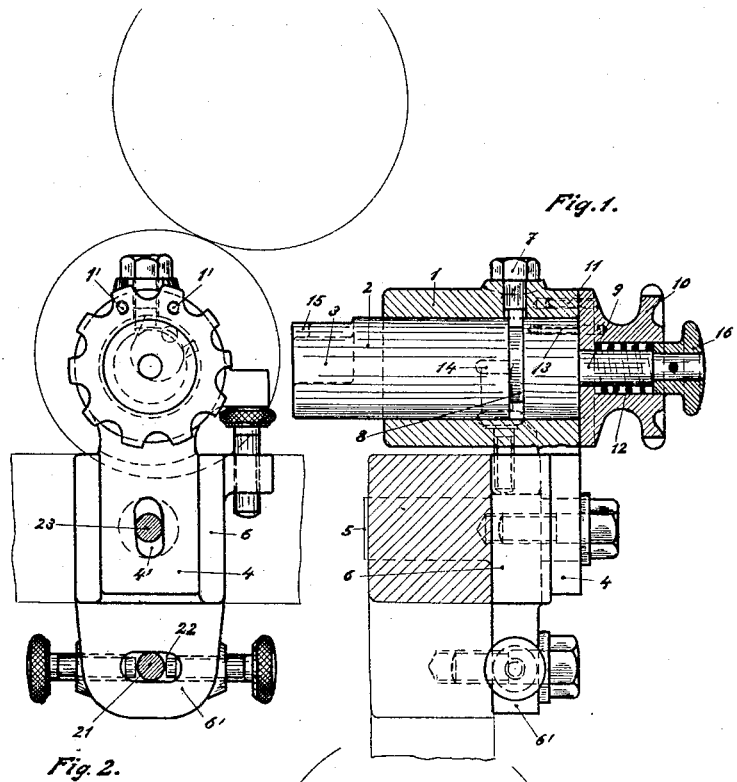
Fig. 1.
Fig. 2.
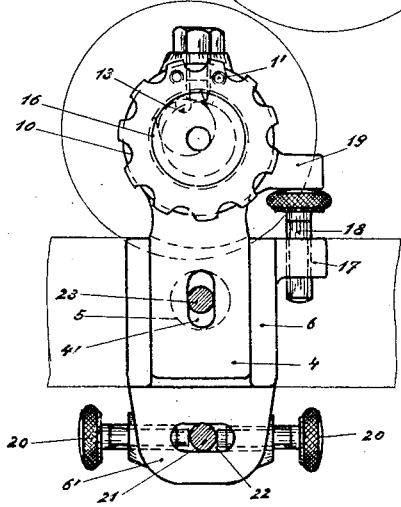
Fig. 3.
INVENTOR
Carl Winkler.
BY
ATTORNEYS

UNITED STATES PATENT OFFICE.

CARL WINKLER, OF BERNE, SWITZERLAND.

LOCK-BEARING FOR THE COMPOSITION ROLLERS OF PRINTING-MACHINES.

1,329,217.   Specification of Letters Patent.   Patented Jan. 27, 1920.

Application filed September 9, 1918. Serial No. 253,313.

*To all whom it may concern:*

Be it known that I, CARL WINKLER, a citizen of the Swiss Republic, residing at Berne, in the Swiss Republic, have invented new and useful Improvements in Lock-Bearings for the Composition Rollers of Printing-Machines, of which the following is a specification.

My present invention relates to a lock bearing for the composition rollers of printing machines. The improved bearing is mounted in the frame of the machine by means of a pivot pin about which it can swing and it is provided with a head-piece to slide vertically, both movements, that is to say, the swinging movement of the whole bearing and the vertical adjustment of the head-piece being adapted to be effected by hand-screws, which enable the lateral and vertical adjustment of the roller to be effected with the greatest accuracy. In the position thus adjusted the bearing is fastened by a suitable bolt or other locking device.

In addition to affording accurate adjustment, this arrangement has the great advantage over existing devices that it is very easily manipulated, because the bearing does not swing about the bolt by which it is fastened, but about a pivot pin provided for this special purpose and arranged to turn in the frame of the machine. The consequence is that the bolt by which the bearing is fastened in the desired position, can be loosened without the bearing losing its hold, and the adjustment can therefore be easily carried out with one hand.

One form of carrying out the invention is shown in the accompanying drawings by way of example.

Figure 1 is a longitudinal section through the whole bearing in connection with a part of the frame of a printing machine.

Figs. 2 and 3 are front views of the bearing in the working and idle positions respectively.

Through the head piece 1 of the bearing there passes the carrier pin 2, which is shown provided with an eccentric boring 3 in which the end of the spindle of the composition roller is seated and rotates. This head-piece extends downward in the form of a tail-piece or slide 4, which is guided by the body or frame 6 of the bearing, connected with the frame of the machine by a pivot pin 5. The carrier pin 2 is prevented from moving longitudinally by the stud 7 which engages in the annular groove 8 formed around pin 2. On an outward extension 9 of the carrier pin 2, a knob 10 is mounted, which is pressed against the head 1 by a helical spring 12. This knob 10 may have a notched or knurled periphery. In the head-piece 1 there are two holes, into one or the other of which a pin 11 attached to the knob 10 projects, the position of these holes 1' 1' being so chosen that when the pin 11 enters one of said holes the composition roller is in the working position (Fig. 2), while when the pin 11 enters the other hole said roller is in the idle position (Fig. 3). This arrangement serves for momentarily putting one or the other of the composition rollers into the working or idle position and forms no part of the invention, inasmuch as it is immaterial in the present invention whether the hole 3 in the pin 2 is eccentric to or concentric with the center of the pin 2.

The knob 10 is connected with the carrier pin 2 by a coupling pin or stud 13 fitting into a suitable socket or hole, which is longer than the holes 1' 1' for the pin 11, so that on turning the knob 10 to put the pin 11 in one or the other of the two corresponding holes 1' 1', the carrier pin 2 is also turned by means of the coupling 13. In adjusting the composition roller it is therefore only necessary to pull out the knob 10 against the pressure of the spring 12 and to turn the knob until the pin 11 reaches the desired hole and the spring 12 will then cause the pin 11 to enter the hole 1'. The spring 12 is mounted upon the extension 9 and is held between the end of an enlarged bore in the knob 10 and an outer knob 16 secured upon extension 9. This outer knob 16 has a shoulder fitting the enlarged bore of the knob 10 and allowing the knob 10 to slide on such shoulder.

If it is desired to remove the composition roller, it is sufficient to turn the knob 10 so far, that a longitudinal groove 14 in the carrier pin 2 registers with the stud 7. The carrier pin 2 can then be pulled out as far as the longitudinal groove 14 will allow. The length of this groove 14 is somewhat less than that of the hole 3, so that when the pin 2 is pulled out it just supports the composition roller but the circumference of the hole 3 is cut away at 15, thus enabling the spindle of the composition roller to be lifted out from pin 2.

The vertical adjustment of the bearing is effected in the simplest manner possible. Through a lug 17 upon the guide piece 6 there passes, for example and as shown in the drawing, a set screw 18, the head of which bears against a lug 19 on the head piece 1, so that by turning this screw 18 the headpiece 1 can be moved vertically, even through quite minute distances, the tail piece 4 then sliding in the guide 6.

A locking bolt 23 extends through a vertical slot 4' and is screwed into the body or frame 6 of the bearing to maintain the tailpiece 4 in the desired relative position to the frame 6.

For the purpose of adjusting the bearing laterally, the frame 6 is extended as at 6' and provided with a transverse slot 22. Screws 20 are provided projecting into the slot 22 from opposite sides, and these bolts 20 bear against the bolt 21 this bolt being fastened to the frame of the machine. By loosening the bolt 21 so that its head or a washer thereunder no longer bears against the front face of the extension 6', and turning the screws 20 which have preferably a very fine thread, the frame 6 of the bearing which carries the tailpiece 4 and head-piece 1, can be swung about pivot pin 5 to obtain the desired lateral movement of the headpiece 1 and thus the latter can be adjusted laterally with the greatest accuracy.

What I claim and desire to secure by Letters Patent of the United States is:—

1. An improved bearing for the composition rollers of printing machines, comprising in combination a frame, a pin for pivoting said frame to the framework of the machine, a bolt adapted to be screwed into the framework of the machine, set-screws provided in said frame and adapted to bear against said bolt on opposite sides, and a head-piece adapted to slide in said frame and being so disposed that said pin is situated between said head-piece and said bolt substantially as set forth.

2. An improved bearing for the composition rollers of printing machines, comprising in combination, a frame, a pin for pivoting said frame to the framework of the machine, a bolt adapted to be screwed into the framework of the machine, set-screws provided in said frame and adapted to bear against said bolt on opposite sides, a head-piece adapted to slide in said frame and being so disposed that said pin is situated between the bearing and said bolt, and a screw on one side of said frame, adapted to adjust the position of said head-piece in regard relatively to said frame, substantially as set forth.

3. An improved bearing for the composition rollers of printing machines, comprising in combination a frame, a pin for pivoting said frame to the framework of the machine, a bolt adapted to be fastened to the framework of the machine, set-screws provided in said frame and adapted to bear against said bolt on opposite sides, a head-piece adapted to slide in said frame and being so disposed that said pin is situated between the head-piece and said bolt and having a tail-piece provided with a slot over said pin, and a bolt passing through said slot and screwed into said pin and adapted to fasten said head-piece in any desired vertical position in regard to said frame, substantially as set forth.

4. An improved bearing for the composition rollers of printing machines, comprising in combination a frame, a pin for pivoting said frame to the framework of the machine, a bolt adapted to be fastened to the framework of the machine, set-screws provided in said frame and adapted to bear against said bolt on opposite sides, a pin having an eccentric boring to accommodate the end of the spindle of the composition roller, and a head-piece adapted to slide in said frame and support said carrier-pin, and being so disposed that said first pin is situated between the carrier-pin and said bolt, substantially as set forth.

5. An improved bearing for the composition rollers of printing machines, comprising in combination, a frame, a pin for pivoting said frame to the framework of the machine, a bolt adapted to be screwed into the frame of the machine, set screws provided in said frame and adapted to bear against said bolt on opposite sides, a head-piece adapted to slide in said frame and being so disposed that said pin is situated between said head-piece and said bolt, a carrier-pin supported by said head-piece and having an eccentric boring to accommodate the end of the spindle of the composition roller and adapted to be moved axially and circumferentially, and means to hold said carrier-pin in different axial and circumferential positions, substantially as set forth.

In testimony whereof I have signed my name to this specification in the presence of two subscribing witnesses.

C. WINKLER.

Witnesses:
O. MURBACH,
CLIDE BLINCH.